(No Model.)

H. C. WOLLE.
MEANS FOR MAKING METALLIC BODIES.

No. 522,093. Patented June 26, 1894.

WITNESSES:
Chas. Nida.
C. Sedgwick

INVENTOR
H. C. Wolle
BY Munn & Co
ATTORNEYS.

UNITED STATES PATENT OFFICE.

HARTLEY C. WOLLE, OF BETHLEHEM, PENNSYLVANIA.

MEANS FOR MAKING METALLIC BODIES.

SPECIFICATION forming part of Letters Patent No. 522,093, dated June 26, 1894.

Application filed August 9, 1893. Serial No. 482,738. (No model.)

*To all whom it may concern:*

Be it known that I, HARTLEY C. WOLLE, of Bethlehem, in the county of Northampton, State of Pennsylvania, have invented a new and Improved Means for Making Metallic Bodies, of which the following is a full, clear, and exact description.

The object of the invention is to provide a new and improved means for making metallic bodies such as pipes, cylinders, &c., and in such a manner as to avoid the necessity of welding flaws from forming in the body and to render the mass very homogeneous.

The invention consists of certain parts and details and combinations of the same, as will be hereinafter described and then pointed out in the claims.

Reference is to be had to the accompanying drawings, forming a part of this specification, in which similar letters of reference indicate corresponding parts in all the figures.

Figure 1:
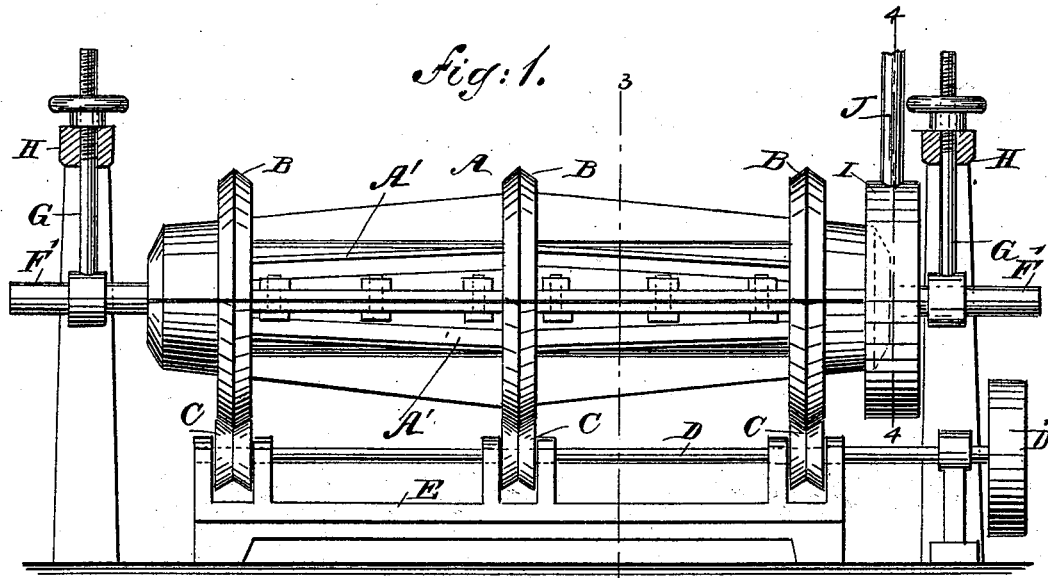
Figure 2:
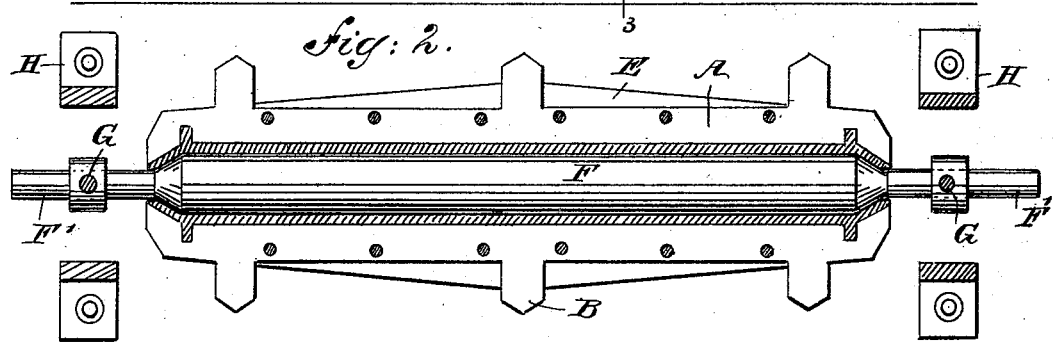
Figures 3, 4, 5:
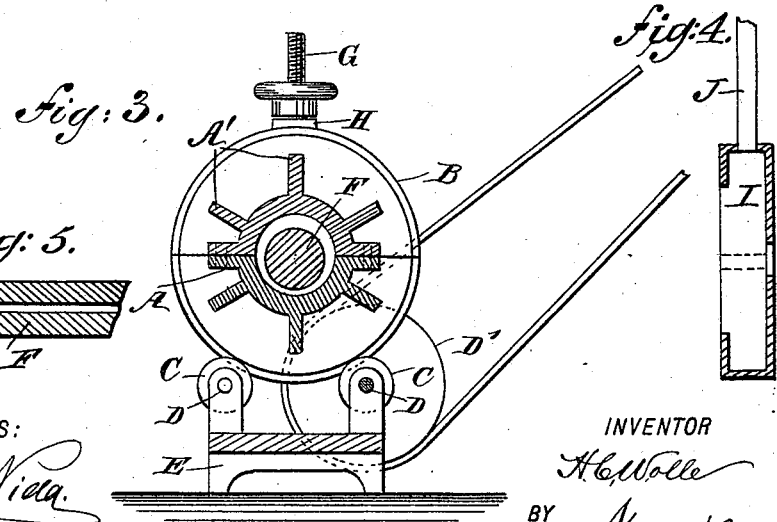

Figure 1 is a side elevation of the improvement with parts in section and arranged for making a flanged pipe. Fig. 2 is a sectional plan view of the same. Fig. 3 is a cross section of the same in the line 3—3 of Fig. 1. Fig. 4 is a longitudinal sectional elevation of the receptacle I, taken at right angles to the line 4—4 of Fig. 1; and Fig. 5 is a broken longitudinal section of a modified form of mandrel.

As illustrated in the drawings, the device is arranged for making a flanged pipe and for this purpose a mold A is provided, preferably made in sections bolted or otherwise fastened together and strengthened by longitudinal ribs, the bore of the mold conforming to the exterior shape of the pipe to be made.

On the sections of the mold A are formed or secured a series of wheel sections B, having edges that are V-shaped in cross section and run in correspondingly-shaped rollers C, secured on longitudinally extending shafts D, mounted to turn in suitable bearings arranged on a frame E. One of the shafts D is provided with a pulley D' connected by a belt with suitable machinery for imparting a rotary motion to the said shaft and to its rollers C to revolve by frictional contact the wheels B, and consequently rotate the mold A.

The mold may be provided with longitudinal strengthening ribs A', as shown in Figs. 1 and 3.

Through the mold extends longitudinally and preferably eccentrically, a mandrel or roller F, of a diameter and shape to meet the requirements of the interior diameter and shape of the pipe to be made. This mandrel or roller may be made solid or hollow. Fig. 5 shows such a hollow mandrel, according to the shape of the body to be made, and to permit of conveniently removing after finishing the form. The ends of the mandrel F are provided with trunnions F' journaled in eyes of bolts G, held vertically-adjustable in standards H, as illustrated in the drawings, so that the mandrel F can be readily adjusted to hold the same in whatever position necessary to form the desired thickness of the pipe or body to be made within the mold A. At one or both ends is arranged a suitable cylindrical receptacle I, adapted to receive the surplus metal leaving the mold.

The operation is as follows:—The molten metal is poured into the mold A in sufficient quantity to make the required form, with the mandrel F raised, and then or at the same time the mold A is rotated so that the molten metal within the mold A is subjected to a centrifugal action to cause the metal to flow, thus spreading the same uniformly within the mold and at the same time causing the molecules of the metal to press firmly in contact with each other to produce finally a very homogeneous mass of metal. To add to the solidity of the same and smoothness of the interior surface, at the same time producing the proper thickness of the form, the roller or mandrel F is brought down by means of the screws H while the metal is in a fluid, semi-fluid or solid condition. It will be understood that the metal rotates with the mold while the axis of the mandrel remains stationary unless it is adjusted, so that each particle of the metal will be subjected to compression by the mandrel once during each revolution of the mold, and this compression will be repeated periodically. If desired gas of any kind may be introduced into the mold through a pipe J to prolong high temperature and prevent oxidation of the metal. By this method of making metallic bodies, great homogeneity of the metal is obtained and flaws prevented.

By arranging the mold horizontally, I eliminate the detrimental influence of gravity which would tend to produce a difference in density between the upper and the lower end of the metallic body, if the mold were placed vertically or at an incline.

Having thus fully described my invention, I claim as new and desire to secure by Letters Patent—

1. The combination, with the horizontally disposed mold, and means for rotating the same, of a mandrel extending longitudinally through the said mold and projecting at each end thereof, bearings in which the respective ends of the mandrel are journaled, and means for adjusting the said bearings toward and from the axis of the mold, substantially as described.

2. The herein described means for making metallic bodies, comprising a revoluble mold, an adjustable mandrel extending through the said mold, means for imparting motion to the said mold, and a receptacle communicating with the mold and adapted to receive the surplus molten metal therefrom, substantially as shown and described.

HARTLEY C. WOLLE.

Witnesses:
C. L. DOOLITTLE,
ERIC DOOLITTLE.